US012676794B2

(12) United States Patent
Pauliac et al.

(10) Patent No.: US 12,676,794 B2
(45) Date of Patent: Jul. 7, 2026

(54) TELECOMMUNICATIONS SYSTEM

(71) Applicants: THALES DIS FRANCE SAS, Meudon (FR); THALES, Courbevoie (FR)

(72) Inventors: Mireille Pauliac, Carnoux (FR); Benoit Jouffrey, Saint-Cyr-sur-Mer (FR); William Stoecklin, Chatillon (FR)

( * ) Notice: Subject to any disclaimer, the term of this patent is extended or adjusted under 35 U.S.C. 154(b) by 287 days.

(21) Appl. No.: 18/257,315

(22) PCT Filed: Dec. 14, 2021

(86) PCT No.: PCT/EP2021/085724
§ 371 (c)(1),
(2) Date: Jun. 14, 2023

(87) PCT Pub. No.: WO2022/129070
PCT Pub. Date: Jun. 23, 2022

(65) Prior Publication Data
US 2024/0106705 A1      Mar. 28, 2024

(30) Foreign Application Priority Data

Dec. 17, 2020    (EP) .................................... 20290087

(51) Int. Cl.
*H04L 41/0813*          (2022.01)
*H04W 88/08*           (2009.01)
(52) U.S. Cl.
CPC ....... *H04L 41/0813* (2013.01); *H04W 88/085* (2013.01)
(58) Field of Classification Search
CPC .................................................. H04L 41/0813

USPC .......................................................... 370/254
See application file for complete search history.

(56) References Cited

U.S. PATENT DOCUMENTS

2020/0245402 A1 * 7/2020 Chiu ....................... H04L 47/34

FOREIGN PATENT DOCUMENTS

EP          3716681 A1 * 9/2020 .......... H04W 36/083
WO    20200167978 A1    8/2020

OTHER PUBLICATIONS

Mobile Competence Center Release 16 3rd Generation Partnership Project; Technical Specification Group Services and System Aspect (Year: 2020).*
International Search Report (PCT/ISA/210) and Written Opinion (PCT/ISA/237) mailed on Mar. 22, 2022, by the European Patent Office as the International Searching Authority for current International Application No. PCT/EP2021/085724—[20 pages].

(Continued)

*Primary Examiner* — Sibte H Bukhari

(57) ABSTRACT

Provided is a telecommunications system comprising a core network, an Integrated Access Backhaul donor arranged in connection with the core network; and a plurality of Integrated Access Backhaul nodes connected to one Integrated Access Backhaul donor, either directly or by means of other Integrated Access Backhaul nodes. At least some of the Integrated Access Backhaul nodes are configured to operate in different backhauling profiles, and at least some of these Integrated Access Backhaul nodes comprise a UICC which is configured to manage a set of backhauling profiles of the corresponding Integrated Access Backhaul node.

11 Claims, 2 Drawing Sheets

(56)  References Cited

OTHER PUBLICATIONS

"3rd Generation Partnership Project; Technical Specification Group Services and System Aspects; 3GPP System Architecture Evolution (SAE); Security architecture (Release 16)"—XP051908472, Retrieved from the Internet: URL: https://ftp.3gpp.org/3guinternal/3GPP_ ultimate_versions_to_be_transposed/sentToDpc/33401-g30.zip33401- g30.doc—[retrieved on Jul. 10, 2020]—1 Scope; D.2 Solution; . . . .

"3rd Generation Partnership Project; Technical Specification Group Services and System Aspects; Study on Security for NR Integrated Access and Backhaul; (Release 16)"—XP051961654,Retrieved from the Internet: URL:https://ftp.3gpp.org/Specs/archive/33_series/33. 824/33824-070.zip - S3-203456-TR33824-rm.doc—[retrieved on Nov. 20, 2020]; . . . .

Huawei et al: "IAB bearer mapping decision and configuration", 3GPP Draft; R2-1906069 IAB Bearer Mapping Decision and Con- figuration, XP051729546, Retrieved from the Internet: URL:http:// www.3gpp.org/ftp/Meetings%5F3GPP%5FSYNC/RAN2/Docs/R2% 2D1906069%2Ezip—[retrieved on May 13, 2019]; . . . .

Samsung: "Updates to Solution #2.1 on MT functionality", 3GPP Draft; XP051810885,—Retrieved from the Internet: URL:https:// ftp.3gpp.org/tsg_sa/WG3_Security/TSGS3_96AH_Chongqing/Docs/ S3-193565.zip S3-193565-IAB-MTAuthSolutionUpdates.doc [retrieved on Oct. 7, 2019]; . . . .

ZTE: "Key issue on Security attack caused by IAB-node with removable UICC card", , XP051824388, Retrieved from the Inter- net: URL:https://ftp.3gpp.org/tsg_sa/WG3_Security/TSGS3_97_ Reno/Docs/S3-194072.zip S3-194072 Key issue on Security attack caused by IAB-node with removable UICC card.doc—[retrieved on Nov. 11, 2019].

Huawei et al: "Discussion on binding between USIM/UICC and IAB-node", XP051810784, Retrieved from the Internet: URL:https:// ftp.3gpp.org/tsg_sa/WG3_Security/TSGS3_96AH_Chongqing/Docs/ S3-193462.zip—S3-193462-Discussion on removal of UICC in IAB node.doc [retrieved on Oct. 7, 2019].

* cited by examiner

TELECOMMUNICATIONS SYSTEM

FIELD

This invention belongs to the field of telecommunications, and more particularly, to the system recovery after a disaster.

BACKGROUND

3GPP consortium has defined a service named Isolated E-UTRAN Operation for Public Safety (IOPS) for LTE, in order to maintain a level of communications between public safety users when the backhaul connectivity to the core network may be lost e.g. the backhauling network was damaged. In addition, 3GPP consortium has been extending this recovery mechanism to 5G New Radio in next-to-come 3GPP releases.

In the nominal mode of operation, gNB (next generation NodeB) is connected to a normal core network (Evolved Packet Core or 5G Core) through a backhauling network forming a mobile network.

This backhauling network may rely on multiple transmission solutions like wireline (eg. optical fiber) or wireless (microwave) and a new approach named Integrated Access Backhaul (IAB) using 5G New Radio (NR).

A key benefit of IAB is that it enables to have a densification of the NR cells, a topic which is particularly crucial for FR2 (millimeter waves) or in areas with high population density (urban environment), without having to densify in the same proportion the radio network (e.g. copper or fiber lines).

The topology of the IAB nodes depends on successful authentication of those nodes by the core network, but there are some scenarios where obstacles or service parameters may compromise the connection between the core network and each of the IAB nodes.

The present invention provides a way to improve the topology management under these circumstances.

Throughout the document, the following acronyms will be used:

gNB Next Generation NodeB
IAB Integrated Access Backhaul

SUMMARY

The invention provides a solution for this problem by means of a telecommunications system according to claim 1. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a telecommunications system comprising a core network;
a plurality of Integrated Access Backhaul nodes connected to one Integrated Access Backhaul donor, either directly or by means of other Integrated Access Backhaul nodes;

a plurality of Integrated Access Backhaul nodes connected to the Integrated Access Backhaul donor, either directly or by means of other Integrated Access Backhaul nodes;
wherein at least some of the Integrated Access Backhaul nodes are configured to operate in different backhauling profiles, and at least some of these Integrated Access Backhaul nodes comprise a UICC which is configured to manage a set of backhauling profiles of the corresponding Integrated Access Backhaul node.

This system allows the Integrated Access Backhaul nodes to perform a local management of their own backhauling profiles. The backhauling profile could be either a nominal profile (e.g. profile for authentication and for topology management) or a fallback profile. A set of backhauling profile could consist of nominal profile(s) and a fallback profile.

In existing networks, there are IAB nodes which comprises UICC, but these UICCs are not configured to manage the backhauling profile of the corresponding IAB node. This feature provides a clear advantage, since the network topology may be customized by the IAB nodes themselves, without the need of the core network.

This independence of the IAB network topology definition from the core network is important for those places where the core network is not directly available or even when the connection is lost. The IAB nodes are provided with a tool which enables them to configure the network topology.

An efficient and cost effective IAB topology management is crucial to ensure a successful deployment in high density areas and in mission critical use cases.

Although the invention is defined with the IAB node comprising a UICC, the invention may also be carried out using an eUICC (embedded UICC), iUICC (integrated UICC), SSP (Smart Secure Platform), iSSP (integrated SSP), eSSP (embedded SSP) or rSSP (removable SSP).

In some particular embodiments, the UICC is used to store securely sensitive data related to the backhauling profiles, such as IAB routing tables.

In this case, the MNO would be enabled to complement the possibilities offered by its Network Equipment Provider in the definition or modification of the IAB routing tables.

In some particular embodiments, the telecommunications system further comprises a topology management server configured to provide or update information to the UICC.

This topology management server may be useful to keep the UICCs updated, so that the profile management considers any particular circumstance that may arise.

In some particular embodiments, the topology management server is configured to update the sensitive data related to the backhauling profiles.

In some particular embodiments, the topology management server communicates via an OTA connection, via SMS secure packet or authentication protocol.

In some particular embodiments, the topology management server is configured to activate an USIM in the UICC or to send a profile to the UICC.

This could be particularly interesting in case of network load, where the activation of specific UICCs could be used to enhance the network capability in precisely targeted areas.

In some particular embodiments, the UICC is configured to swap from one backhauling profile to a different backhauling profile. In more specific embodiments, the UICC relies on some information available in the corresponding Integrated Access Backhaul node to choose the most adequate profile.

In some particular embodiments, the set of backhauling profiles comprises at least a profile for IAB topology management and for IAB authentication, a fallback profile.

In some particular embodiments, the fallback profile is used for sending diagnostic information, maintenance purposes.

Although the fallback profile would be the standard profile for sending diagnostic information, this action could also be part of the nominal profile for IAB topology management.

In some particular embodiments, the telecommunications system further comprises a plurality of gNBs directly connected to the core network by means of an optical fibre connection.

In some particular embodiments, the Integrated Access Backhaul nodes are connected to the Integrated Access Backhaul donor by means of a wireless backhaul link.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
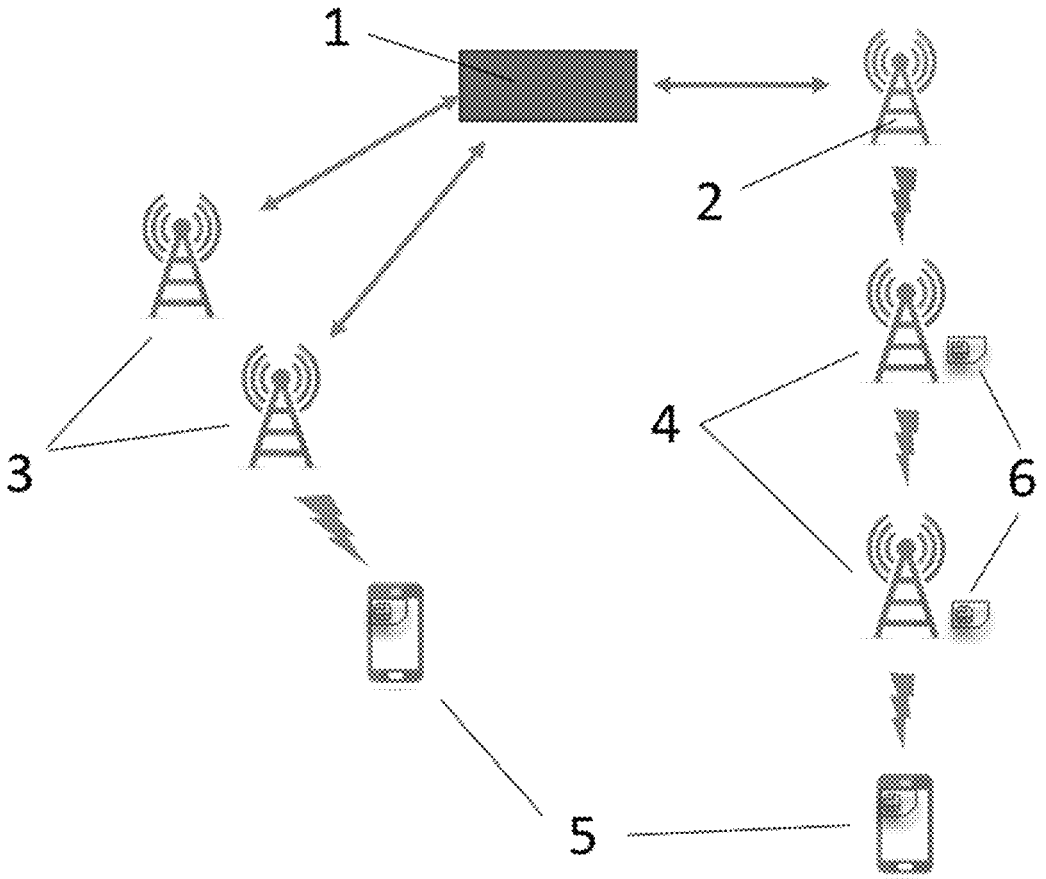
FIG. 1 shows a first example of a telecommunications system according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a first example of a telecommunications system according to the invention. This system comprises
   a core network 1;
   an Integrated Access Backhaul donor 2 arranged in connection with the core network 1; and
   a plurality of gNBs 3 connected to the core network 1 by means of an optical fibre connection;
   a plurality of Integrated Access Backhaul nodes 4 connected to Integrated Access Backhaul donor 2 by means of a wireless backhaul link, either directly or by means of other Integrated Access Backhaul nodes 4.

Both the gNBs 3 and the Integrated Access Backhaul nodes 4 are configured to provide connection to a user equipment 5.

Each of the Integrated Access Backhaul nodes 4 are configured to work in a profile selected from a set of backhauling profiles. This set of backhauling profiles comprises a plurality of nominal profiles (e.g. profile for authentication and for topology management) and a fallback profile.

These Integrated Access Backhaul nodes 4 comprise a UICC 6 which is configured to manage the set of backhauling profiles of the corresponding Integrated Access Backhaul node 4.

Although the invention is defined with the IAB node comprising a UICC, the invention may also be carried out using an eUICC (embedded UICC), iUICC (integrated UICC), SSP (Smart Secure Platform), iSSP (integrated SSP), eSSP (embedded SSP) or rSSP (removable SSP).

This system allows the Integrated Access Backhaul nodes 4 to perform a local management of their own backhauling profiles. This independence of the IAB network topology definition from the core network 1 is important for those places where the core network is not directly available or even when the connection is lost. The IAB nodes are provided with a tool which enables them to configure the network topology.

The UICC 6 comprised in these Integrated Access Backhaul nodes 4 is used to securely store sensitive data related to the backhauling profiles, such as IAB routing tables.

The UICC 6 is configured to swap from one backhauling profile to a different backhauling profile according to an internal mechanism which is configured to define the most adequate profile according to the context. This context may rely on information available in the corresponding Integrated Access Backhaul node, e.g. update of data specific to loss of coverage. In this way, the Integrated Access Backhaul nodes are configured to proactively decide to step-in or out of the backhauling topology (e.g. by swapping to another profile than the one used the IAB authentication).

Further, the Integrated Access Backhaul nodes are also configured to swap to a fallback profile in case the wireless backhaul link is not established correctly. This fallback profile could be used for different use cases such as: send diagnostic information, maintenance purposes.

Figure 2:
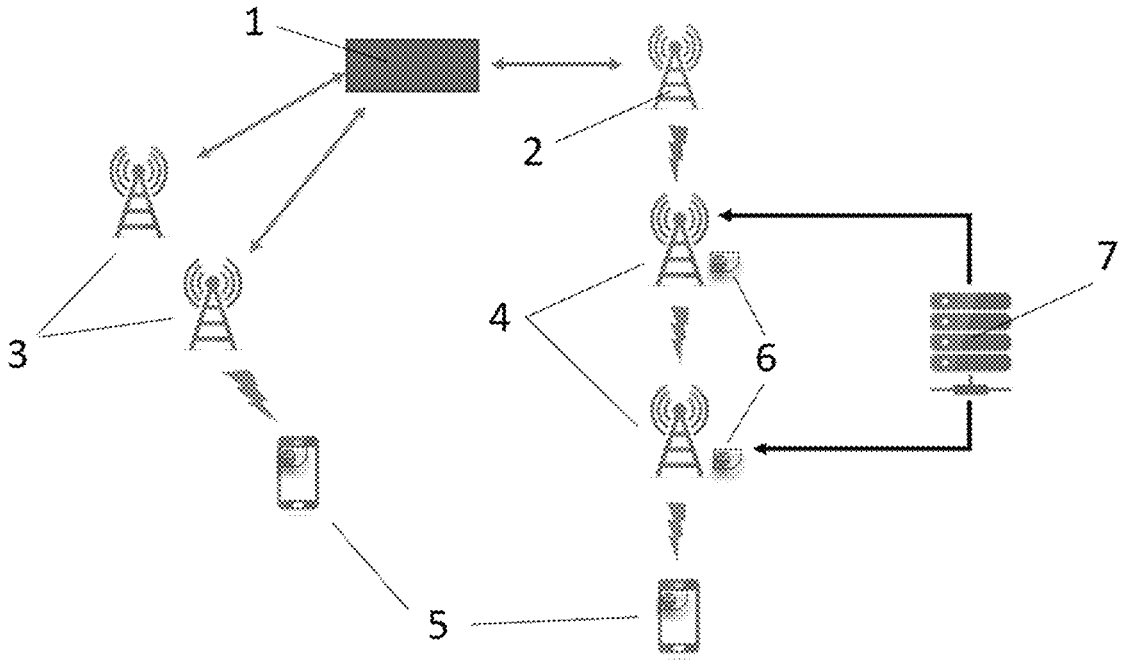
FIG. 2 shows an alternative embodiment of a telecommunications system according to the invention.

FIG. 2 shows an alternative embodiment of a telecommunications system according to the invention.

In this embodiment, the system further comprises a topology management server 7 configured to provide or update information to the UICC 6. This provision of information may be done via an OTA connection, via SMS secure packet or authentication protocol.

The topology management server 7 cooperates in the topology management performed by the UICCs of the Integrated Access Backhaul nodes. This topology management server is configured to perform, in some cases, the activation of an USIM in the UICC or the updating of a profile to the UICC. This could be particularly interesting in case of network load, where the activation of specific UICCs could be used to enhance the network capability in precisely targeted areas.

The invention claimed is:
   1. A telecommunications system comprising:
   a core network;
   at least one Integrated Access Backhaul (IAB) donor arranged in connection with the core network; and
   a plurality of Integrated Access Backhaul nodes connected to one Integrated Access Backhaul donor, either directly or by means of other Integrated Access Backhaul nodes;
   wherein at least some of the Integrated Access Backhaul nodes operate in different backhauling profiles, and at least some of these Integrated Access Backhaul nodes comprise a Universal Integrated Circuit Card UICC including a processor a memory storing profile management data and executable instructions, the executable instructions, when executed by the processor of the UICC, causing the UICC to:

manage a set of backhauling profiles of the corresponding Integrated Access Backhaul node, selectively apply one of the backhauling profiles for Integrated Access Backhaul topology management and Integrated Access Backhaul authentication; and apply a fallback backhauling profile in response to a condition associated with topology management or authentication, said set of backhauling profiles comprising at least a profile for IAB topology management and for IAB authentication and the fallback backhauling profile.

2. The telecommunications system according to claim 1, wherein the UICC is used to store securely sensitive data related to the backhauling profiles, such as IAB routing tables.

3. The telecommunications system according to claim 1, further comprising a topology management server configured to provide or update information to the UICC.

4. The telecommunications system according to claim 3, wherein the topology management server is configured to update the sensitive data related to the backhauling profiles.

5. The telecommunications system according to claim 3, wherein the topology management server communicates via an Over the Air (OTA) connection, via Short Message Service (SMS) secure packet or authentication protocol.

6. The telecommunications system according to claim 3, wherein the topology management server is configured to activate an Universal Subscriber Identity Module USIM in the UICC or to send a profile to the UICC.

7. The telecommunications system according to claim 1, wherein the UICC is configured to swap from one backhauling profile to a different backhauling profile particularly relying on some information available in the corresponding Integrated Access Backhaul node to choose the most adequate profile.

8. The telecommunications system according to claim 1, wherein the fallback backhauling profile is used for sending diagnostic information and for maintenance purposes.

9. The telecommunications system according to claim 1, further comprising a plurality of next Generation Nodes (gNBs) directly connected to the core network by means of an optical fiber connection.

10. The telecommunications system according to claim 1, wherein the Integrated Access Backhaul nodes are connected to the Integrated Access Backhaul donor by means of a wireless backhaul link.

11. A Universal Integrated Circuit Card UICC including a processor a memory storing profile management data and executable instructions, operating within a telecommunications system comprising: a core network; at least one Integrated Access Backhaul (IAB) donor arranged in connection with the core network; and a plurality of Integrated Access Backhaul nodes connected to one Integrated Access Backhaul donor, either directly or by means of other Integrated Access Backhaul nodes; wherein at least some of the Integrated Access Backhaul operate in different backhauling profiles, and at least some of these Integrated Access Backhaul nodes comprise the UICC;

wherein the executable instructions, when executed by the processor of the UICC, causing the UICC to:

manage a set of backhauling profiles of the corresponding Integrated Access Backhaul node;

selectively apply one of the backhauling profiles for Integrated Access Backhaul topology management and Integrated Access Backhaul authentication; and apply a fallback backhauling profile in response to a condition associated with topology management or authentication, said set of backhauling profiles comprising at least a profile for IAB topology management and for IAB authentication and the fallback backhauling profile.

* * * * *